(12) United States Patent
Ragona et al.

(10) Patent No.: US 8,866,464 B2
(45) Date of Patent: Oct. 21, 2014

(54) SYSTEMS AND METHODS FOR REAL TIME CURRENT SENSE FOR A SWITCHING CONVERTER

(75) Inventors: Scott E. Ragona, Bethlehem, PA (US); Rengang Chen, Hellertown, PA (US); David Jauregui, Bethlehem, PA (US)

(73) Assignee: Texas Instruments Incorporated, Dallas, TX (US)

( * ) Notice: Subject to any disclaimer, the term of this patent is extended or adjusted under 35 U.S.C. 154(b) by 182 days.

(21) Appl. No.: 13/327,146

(22) Filed: Dec. 15, 2011

(65) Prior Publication Data
US 2013/0154590 A1  Jun. 20, 2013

(51) Int. Cl.
*G05F 1/00* (2006.01)

(52) U.S. Cl.
USPC ............................ 323/288; 323/284; 323/290

(58) Field of Classification Search
USPC ......... 323/299, 301, 282, 285, 283, 284, 288, 323/290
See application file for complete search history.

(56) References Cited

U.S. PATENT DOCUMENTS

| | | | | |
|---|---|---|---|---|
| 6,377,032 B1 * | 4/2002 | Andruzzi et al. | ............ | 323/224 |
| 6,381,159 B2 * | 4/2002 | Oknaian et al. | .................. | 363/98 |
| 6,930,474 B2 * | 8/2005 | Wang | ............................ | 323/288 |
| 7,019,504 B2 * | 3/2006 | Pullen et al. | .................. | 323/283 |
| 7,119,522 B1 * | 10/2006 | Tomiyoshi | .................... | 323/224 |
| 7,372,241 B1 * | 5/2008 | Tomiyoshi | .................... | 323/288 |
| 7,777,472 B2 * | 8/2010 | Uehara | ........................ | 323/284 |
| 8,334,682 B2 * | 12/2012 | Chiu et al. | .................... | 323/282 |
| 2009/0315527 A1 * | 12/2009 | Kung et al. | .................... | 323/282 |
| 2012/0229107 A1 * | 9/2012 | Chen et al. | .................... | 323/271 |

* cited by examiner

*Primary Examiner* — Jue Zhang
*Assistant Examiner* — Lakaisha Jackson
(74) *Attorney, Agent, or Firm* — William B. Kempler; Frederick J. Telecky, Jr.

(57) ABSTRACT

Systems and methods for regulating a switching converter are disclosed. One embodiment of the present invention relates to a power supply system that includes a switching converter that provides an output voltage by alternately turning on and off a high-side transistor and a low-side transistor both coupled to an output inductor through a switching node. The switching converter includes a drive circuit that regulates the output voltage based on a feedback signal. The power supply system also includes a simulated output generator that generates and provides the drive circuit with a simulated inductor waveform as the feedback signal based on a low-side output waveform of the low-side transistor measured at the switching node during off-times of the switching converter.

15 Claims, 3 Drawing Sheets

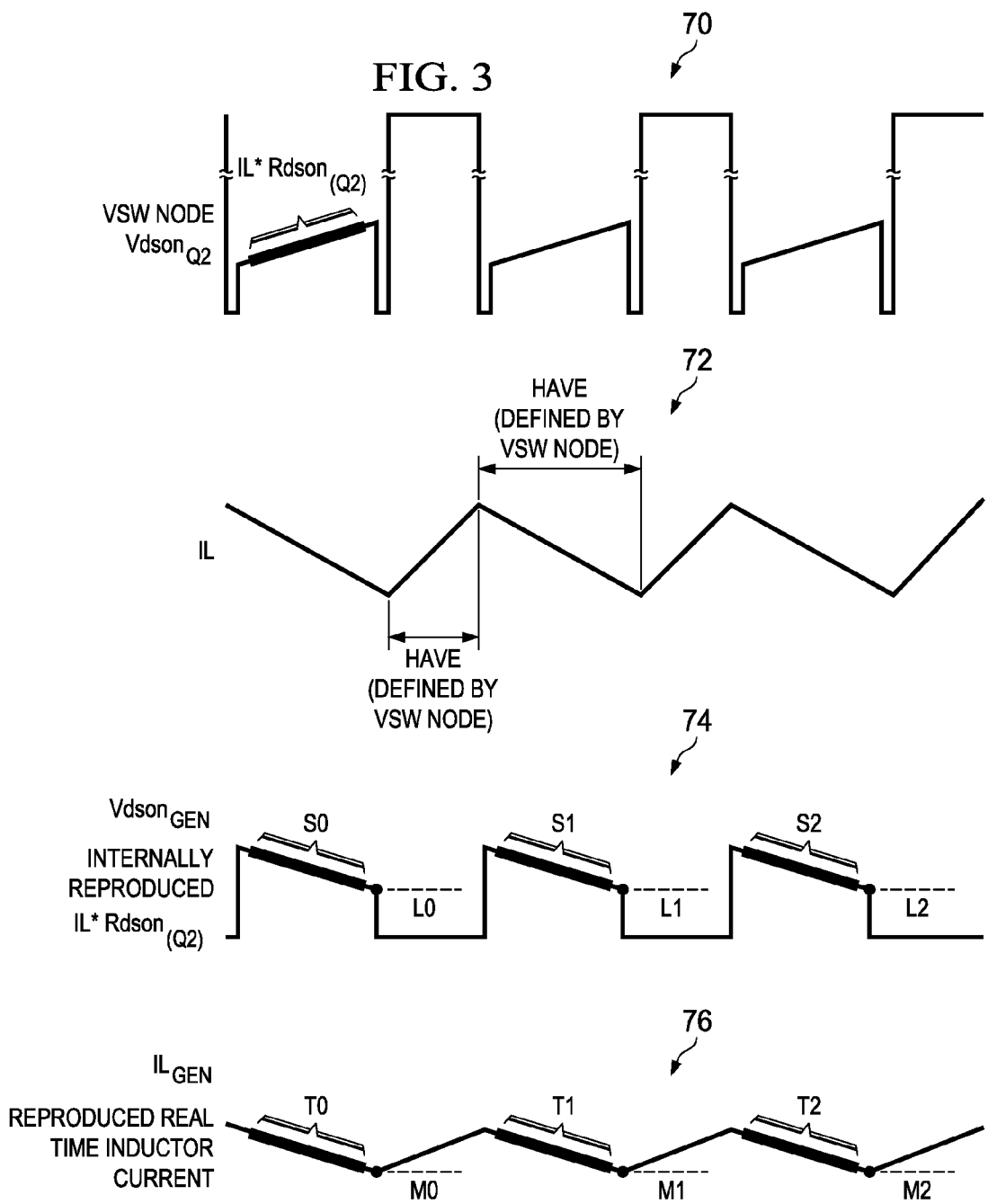

SYSTEMS AND METHODS FOR REAL TIME CURRENT SENSE FOR A SWITCHING CONVERTER

TECHNICAL FIELD

The present invention relates generally to electronics, and specifically to systems and methods for regulating a switching converter.

BACKGROUND

Switching regulators have been implemented as an efficient mechanism for providing a regulated output in power supplies. One such type of regulator is known as a switching supply circuit, which controls the flow of power to a load by controlling the "ON" and "OFF" duty-cycle of one or more high-side switches coupled to the load. Many different classes of switching supplies exist today. One type of switching supply circuit is known as a synchronous switching supply circuit. In a synchronous switching supply circuit, an inductor is used to maintain current flow that is switched from two separate sources. The two sources can include a high-side switch, such as a high-side field-effect transistor (FET), and a low-side switch, such as a low-side FET. After the high-side FET is deactivated, the low side FET becomes activated. The low side FET thus conducts current from ground to the inductor because magnetic power stored in the inductor dissipates to force current through the inductor by changing the voltage of the inductor source node to negative relative to ground. In this way, current continuously flows through the inductor, even at times when the high-side switch is deactivated.

It is desirable in the design of switching supplies to ensure that the output of the switching supply circuit is properly regulated. For example, if a load at the output of the switching supply circuit changes, it may be necessary to change the switching operation, such as by adjusting the switching duty cycle, to regulate the output voltage to a relatively constant level. Regulation is typically accomplished through feedback control, by either a voltage feedback technique, in which the output voltage of the switching supply is monitored, or a current feedback technique, in which both the output voltage and the inductor current are monitored. The current feedback technique can monitor the inductor current by connecting a current sense resistor in series with the output inductor. However, a resistor connected in series with the output inductor can result in a degradation of the performance efficiency of the switching supply circuit. Another way to accomplish the current feedback technique is by employing inductor direct current resistance (DCR) sensing, which is determining the inductor current by measuring the voltage drop across the parasitic resistance of the inductor. However, DCR sensing has several pitfalls, such as requiring external temperature compensation, dealing with large DCR tolerances that limit overall accuracy, the need to have additional routing from the integrated circuit to power components and the inability to utilize minimum DCR inductors to preserve signal integrity.

SUMMARY

In accordance with an aspect of the present invention, a power supply system is provided that comprises a switching converter that provides an output voltage by alternately turning on and off between opposing states a high-side transistor and a low-side transistor both coupled to an output inductor through a switching node. The switching converter includes a drive circuit that regulates the output voltage based on a feedback signal. The power supply system also comprises a simulated output generator that generates and provides the drive circuit with a simulated inductor waveform as the feedback signal based on a low-side output waveform of the low-side transistor measured at the switching node during off-times of the switching converter.

In accordance with another aspect of the invention, a simulated output generator provides a simulated inductor waveform to be employed as a feedback signal to a switching converter that includes a high-side transistor and a low-side transistor both coupled to an output inductor through a switching node. The high-side and low side-transistors alternate between opposing on and off states with the high-side transistor being on during on-times and the low-side transistor being on during off-times. The simulated output generator comprises a gain and inverter circuit that receives a low-side output waveform of the low-side transistor measured during off-times and generates an amplified inverted version of the low-side output waveform, a first control loop that regulates the falling edge slope of the simulated inductor waveform with the amplified, inverted version of the low-side output waveform and a second control loop that regulates minimum values of the simulated inductor waveform with the amplified, inverted version of the low-side output waveform of the low-side transistor. The simulated output generator also comprises a charging capacitor coupled to outputs of the first and second control loops. The charging capacitor charges to produce on-times of the simulated inductor waveform and discharges to produce off-times of the simulated inductor waveform, wherein the first control loop controls the modulation of the charging of the charging capacitor and the second control loop controls the modulation of the discharging of the charging capacitor.

In accordance with yet another aspect of the invention, a method is provided for regulating a switching converter that includes a high-side transistor and a low-side transistor both coupled to an output inductor through a switching node. The method comprises alternating turning on and off the high-side transistor and the low side-transistor between opposing states with the high-side transistor being on during on-times and the low-side transistor being on during off-times, inverting and amplifying a low-side output waveform of the low-side transistor measured during off-times, determining a high-side portion of the simulated inductor waveform during on-times based on the low-side output waveform, and generating a simulated inductor waveform that is proportional to the actual inductor output current through the output inductor based on the low-side output waveform and the determined high-side portion.

BRIEF DESCRIPTION OF THE DRAWINGS

FIG. 3 illustrates exemplary waveforms of the system of FIG. 1 and simulated output generator of FIG. 2 in accordance with an aspect of the present invention.

DETAILED DESCRIPTION

Systems and methods are provided for regulating a power supply. The systems and methods provide a simulated inductor waveform as a feedback signal to a switching converter based on a low-side output waveform of a low-side transistor measured at a switching node during off-times of the switching converter. An amplified, inverted version of the low-side output waveform can be employed to determine a high-side portion of the simulated inductor waveform during on-times of the switching converter. The simulated inductor waveform is a real time signal representation of an actual output inductor current and eliminates the need for inductor direct current resistance (DCR) sensing. The systems and methods also eliminate the need for external temperature compensation, allow for the use of low DCR inductors that improve overall efficiency, and allow for more accurate cycle by cycle regulation and improved load transient responses.

Figure 1:
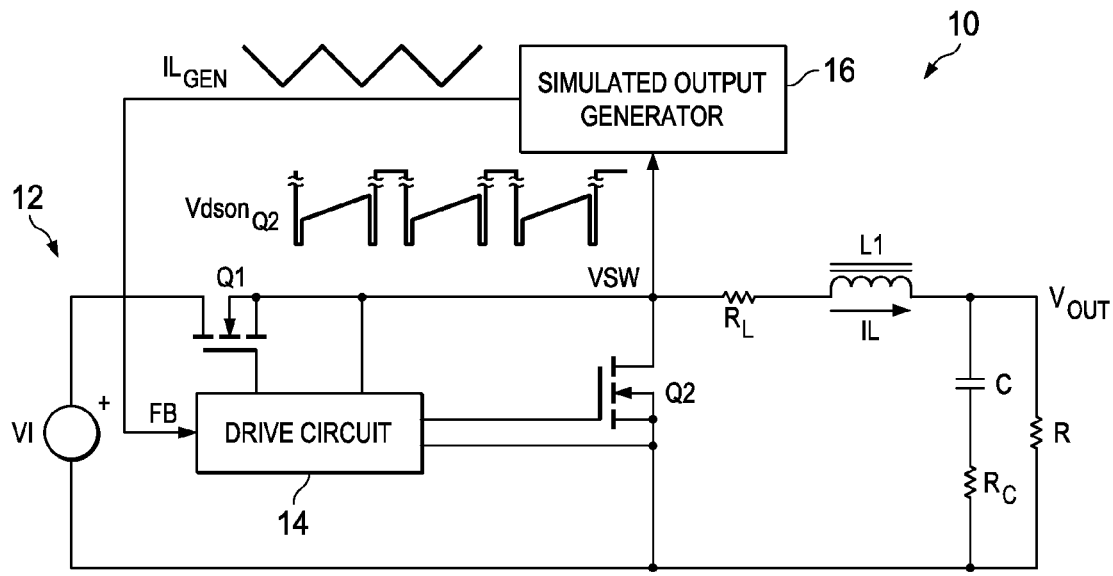
FIG. 1 illustrates a power supply system that includes a switching supply circuit and a simulated output generator in accordance with an aspect of the present invention.

FIG. 1 illustrates a power supply system 10 that includes a switching supply circuit 12 and a simulated output generator 16 in accordance with an aspect of the present invention. The switching supply circuit 12 could be, for example, a synchronous buck or a synchronous boost converter, and could be a self-oscillating or a fixed-frequency pulse-width modulation regulator. The switching supply circuit 12 includes a driver control circuit 14 that controls the operation of a high-side field-effect transistor (FET) Q1 and a low-side FET Q2. The high-side FET Q1 and the low-side FET Q2 are demonstrated in the example of FIG. 1 as N-type FETs. However, other types of transistors could be used in accordance with an aspect of the invention. The high-side FET Q1 is interconnected between a positive voltage rail $V_I$ at a drain terminal and a switching node VSW at a source terminal. The low-side FET Q2 is interconnected between the switching node VSW at a drain terminal and a negative voltage rail at a source terminal, the negative voltage rail being demonstrated as ground in the example of FIG. 1. The driver control circuit 14 thus controls the voltage potential at the switching node VSW by alternately switching between opposing "ON" and "OFF" states of the high-side FET Q1 and the low-side FET Q2. It is to be understood that the opposing switching of the high-side FET Q1 and of the low side FET Q2 is such that only one of the high-side FET Q1 and the low side FET Q2 may be activated at a given time to avoid a short circuit between the positive rail $V_I$ and ground.

The switching supply circuit 12 also includes an output inductor L1 coupled to the switching node VSW through a load resistor $R_L$. The output inductor L1 is interconnected between the switching node VSW and the output $V_{OUT}$ of the switching supply circuit 12, the output $V_{OUT}$ being coupled to ground by a series connected resistor $R_C$ and capacitor C both coupled in parallel with resistor R. The output inductor L1 maintains current $I_L$ flowing to the output of the switching supply circuit 12, as described above. Because the load at the output of the switching supply circuit 12 may change in response to the operation of other circuit components to which the switching supply circuit 12 is supplying power, the output of the switching supply circuit 12 needs to be regulated to maintain relatively constant output voltage $V_{OUT}$. Accordingly, the switching supply circuit 12 includes a simulated output generator 16 that supplies feedback to the driver control circuit 14, the feedback being a simulated output signal that is proportional to the output current signal $I_L$.

The simulated output generator 16 receives inputs from the switching node VSW during activation of the low-side FET Q2 and deactivation of the high-side FET Q1 (referred to as off-times), and measures a low-side output waveform of the low-side FET Q2, which could be a voltage waveform (Vdson$_{Q2}$) across the low-side FET. The simulated output generator 16 then generates a simulated inductor current waveform (IL$_{GEN}$) that is proportional to the inductor output current $I_L$ by employing an amplified, inverted version of the low-side output waveform and determining a high-side portion (referred to as the "on-time") of the simulated inductor current waveform utilizing the slope and minimum values of the amplified, inverted low-side output waveform. Alternatively, the simulated output signal could be a voltage waveform that corresponds approximately to the output current $I_L$. It is to be appreciated that the simulated output generator 16 can amplify and temperature compensate the low-side output waveform. The driver control circuit 14 receives the simulated output signal as feedback for the purpose of regulating the output voltage Vout, for example, by controlling the amount of time (e.g., duty cycle) that the high-side FET Q1 is "ON" relative to the low-side FET Q2.

Figure 2:
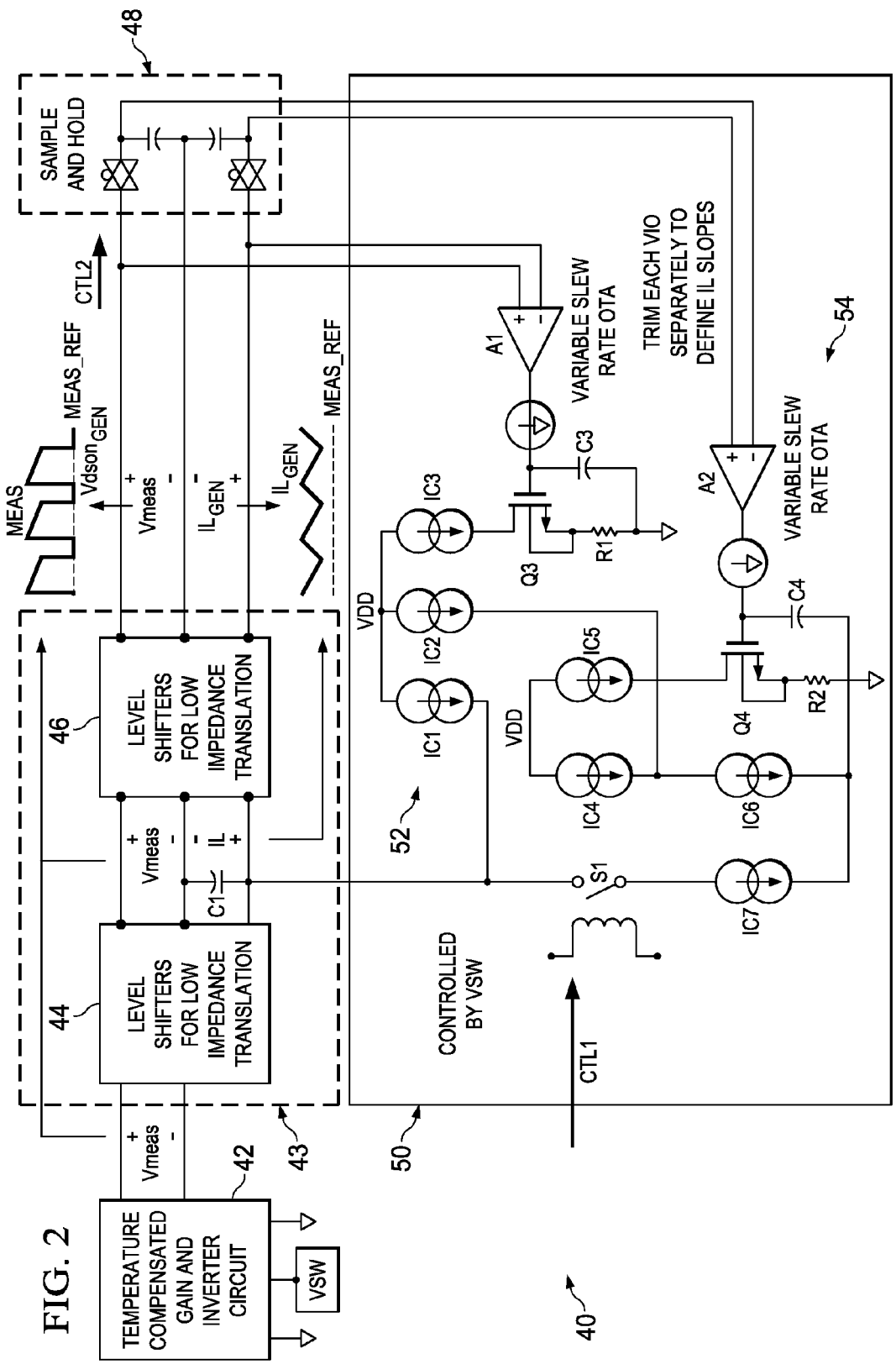
FIG. 2 illustrates an example of a simulated output generator in accordance with an aspect of the present invention.

FIG. 2 illustrates an example of a simulated output generator 40 in accordance with an aspect of the present invention. The simulated output generator 40 includes a temperature compensated gain and inverter circuit 42 that receives inputs from the switching node VSW during activation of the low-side FET Q2 and deactivation of the high-side FET Q1 (i.e., during off-times), and measures a low-side output waveform of the low-side FET Q2, which is a voltage waveform (Vdson$_{o2}$) across the low-side FET Q2, as illustrated in waveform 70 of FIG. 3. The temperature compensated gain and inverter circuit 42 can include current sources and other components that are tuned to compensate for temperature variation during operation. The temperature compensated gain and inverter circuit 42 also provides gain to the low-side output waveform since this signal is a low voltage level signal (e.g., +/−50 mV). The temperature compensated gain and inverter circuit 42 inverts the low-side output waveform and sets the gain of the signal to substantially match the slope of the actual output current $I_L$, as illustrated in waveform 72 of FIG. 3, through the inductor L1 during the off-time of the switching converter 12.

The temperature compensated, amplified and inverted low-side output waveform is provided to a buffer 43 formed of a first level shifter 44 and a second level shifter 46. The first level shifter 44 provides for a low impedance translation and is configured to shift the signal such that the signal has a negative voltage rail set to a user defined value greater than 0V, so as to provide for the capturing of negative current information. The output of the second level shifter 46 provides a low impedance amplified, inverted version of the low-side output waveform referred to an internally reproduced low-side FET voltage waveform (Vdson$_{GEN}$) (i.e., IL*Rdson(Q2)), as illustrated in the waveform 74 of FIG. 3. The output of the second level shifter 46 also provides a simulated inductor current waveform (IL$_{GEN}$), as illustrated in waveform 76 of FIG. 3, that is proportional to the actual inductor output current waveform $I_L$, as illustrated in waveform 72 of FIG. 3. The simulated inductor current waveform (IL$_{GEN}$) is generated with a waveform generator 50 and a charging capacitor C1.

The waveform generator 50 includes a first control loop 52 that regulates the slopes of the simulated inductor current waveform (IL$_{GEN}$) with the slopes of the internally reproduced low-side FET voltage waveform (Vdson$_{GEN}$), such that the first control loop 52 controls the modulation of the charging of the capacitor C1 during on-times. The waveform generator 50 includes a second control loop 54 that regulates the minimum values of the simulated inductor current waveform (IL$_{GEN}$) with the minimum values of the internally reproduced low-side FET voltage waveform (Vdson$_{GEN}$), such that the second control loop 54 controls the modulation of the discharging of the capacitor C1 during off-times. The first control loop forces the simulated inductor current waveform (IL$_{GEN}$) to intersect the actual inductor output current waveform $I_L$ in the middle of the defined regulation period, while the second control loops pulls in the simulated inductor current waveform ($IL_{GEN}$) to match the actual inductor output current waveform $I_L$. The first and second control loops 52 and 54 in conjunction with the charging and discharging of capacitor C1 facilitate the generation of the simulated inductor current waveform ($IL_{GEN}$) that is proportional to the actual inductor output current waveform $I_L$. The switch S1 is coupled between the second control loop 54 and the charging capacitor C1 and is controlled by a control signal CTRL1, which is derived from a switching signal that controls the switching of the high-side FET and/or the low-side FET.

The first control loop 52 includes a first transconductance amplifier (A1) that receives as inputs the simulated inductor current waveform ($IL_{GEN}$) and the internally reproduced low-side FET voltage waveform ($Vdson_{GEN}$) directly from the second level shifter 46. The output of the first control loop 52 is coupled to the charging capacitor C1, which is coupled between the first level shifter 44 and the second level shifter 46, and modulates the charging of the charging capacitor C1. The output of the first transconductance amplifier (A1) is coupled to a transistor Q3, resistor R1 and compensation network capacitor C3 arrangement which is in turn coupled to an arrangement of current sources IC1-IC3, which all cooperate to perform the functions of the first control loop 52. For example, as illustrated in FIG. 3, the first control loop 52 functions to regulate the slopes of T0, T1, T2 of simulated inductor current waveform ($IL_{GEN}$) 76 with the respective slopes S0, S1 and S2 of the internally reproduced low-side FET voltage waveform ($Vdson_{GEN}$) 74.

The second control loop 54 includes a second transconductance amplifier (A2) that receives as inputs the sampled minimum values of the simulated inductor current waveform ($I_{L-GEN}$) and the sampled minimum values of the internally reproduced low-side FET voltage waveform ($Vdson_{GEN}$). The second control loop 54 receives inputs from a sample and hold device 48 that includes a first sample and hold circuit that samples the simulated inductor current waveform ($I_{LGEN}$) output from the second level shifter 46 and a second sample and hold circuit that samples the internally reproduced low-side FET voltage waveform ($Vdson_{GEN}$) from the second level shifter 46. The sample and hold device 48 is controlled by a control signal CTRL2, which is derived from a switching signal that controls the switching of the high-side FET and/or the low-side FET. In this manner, the first sample and hold circuit attempts to sample the simulated inductor current waveform ($I_{LGEN}$) output at its minimum values and the second sample and hold circuit attempts to sample the internally reproduced low-side FET voltage waveform ($Vdson_{GEN}$) output at its minimum values.

The output of the second control loop 54 is coupled to the charging capacitor C1 through the switch S1 and modulates the discharging of the charging capacitor C1. The output of the second output transconductance amplifier (A2) is coupled to a transistor Q4, resistor R2 and compensation network capacitor C4 arrangement which is in turn coupled to an arrangement of current sources IC4-IC7, which all cooperate to perform the functions of the second control loop 54. For example, as illustrated in FIG. 3, the first control loop 52 functions to regulate the minimum values of M0, M1, M2 of simulated inductor current waveform ($IL_{GEN}$) 76 with the respective minimum values L0, L1 and L2 of the internally reproduced low-side FET voltage waveform ($Vdson_{GEN}$) 74.

Figure 4:
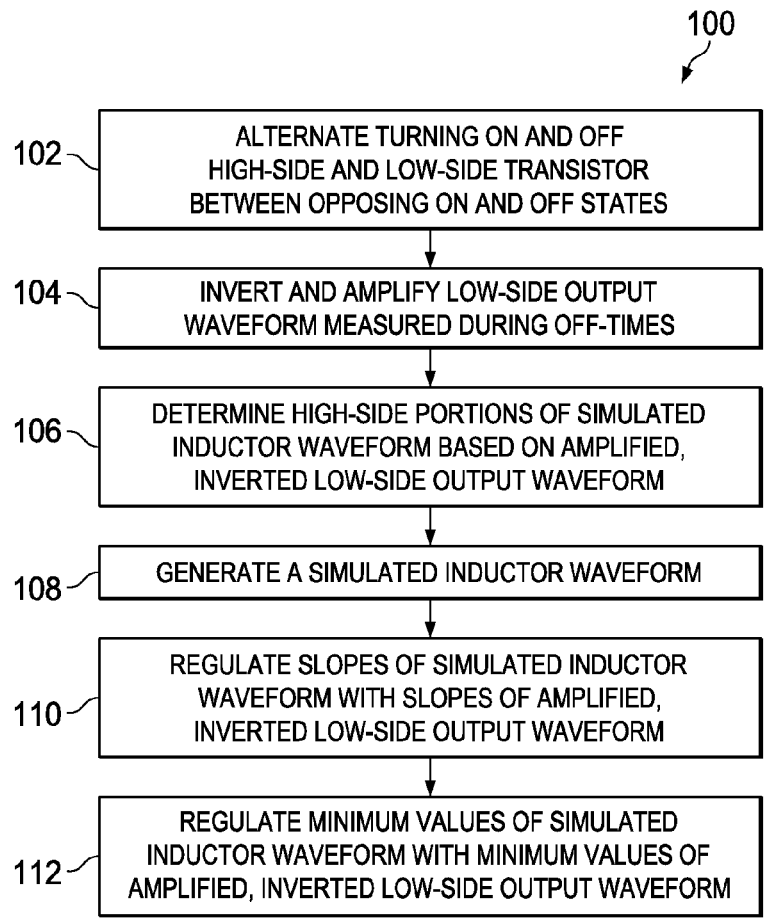
FIG. 4 illustrates a method of regulating a switching converter in accordance with an aspect of the present invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates an example of a method 100 for regulating a switching converter that includes a high-side transistor and a low-side transistor both coupled to an output inductor through a switching node. The method begins at 102 where the high-side transistor and the low side-transistor are alternately turned on and off with the high-side transistor being on during on-times and the low-side transistor being on during off-times. At 104, the low-side output waveform of the low-side transistor measured during off-times is inverted and amplified. At 106, a high-side portion of a simulated inductor waveform during on-times is determined based on the amplified, inverted version of the low-side output waveform. At 108, a simulated inductor waveform is generated that is proportional to an actual inductor output waveform through the output inductor based on the amplified, inverted version of the low-side output waveform and the determined high-side portion. The methodology then proceeds to 110. At 110, slopes of the simulated inductor waveform are regulated with the amplified, inverted version of the low-side output waveform. At 112, minimum values of the simulated inductor waveform are regulated with the amplified, inverted version of the low-side output waveform.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising:
   a switching converter that provides an output voltage by alternately turning on and off between opposing states a high-side transistor and a low-side transistor both coupled to an output inductor through a switching node, the switching converter including a drive circuit that regulates the output voltage based on a feedback signal; and
   a simulated output generator that generates and provides the drive circuit with a simulated inductor waveform as the feedback signal based on a low-side output waveform of the low-side transistor measured at the switching node during off-times of the switching converter, wherein a first control loop comprises a first transconductance amplifier with an output coupled to a first compensation network capacitor and with inputs that receive the simulated inductor waveform and the amplified, inverted version of the low-side output waveform, the first control loop regulates slopes of the simulated inductor waveform with the amplified, inverted version of the low-side output waveform and a second control loop comprises a second transconductance amplifier with an output coupled to a second compensation network capacitor and with inputs that receive sampled minimum values of the simulated inductor waveform and sampled minimum values of the amplified, inverted version of the low-side output waveform, the second control loop regulates minimum values of the simulated inductor waveform with the amplified, inverted version of the low-side output waveform;
   further comprising a charging capacitor that charges to produce on-times of the simulated inductor waveform and discharges to produce off-times of the simulated inductor waveform, wherein the first control loop controls the modulation of the charging of the charging capacitor and the second control loop controls the modulation of the discharging of the charging capacitor.

2. The system of claim 1, wherein the simulated inductor waveform is a simulated inductor current waveform that is proportional to the actual inductor output current waveform through the output inductor.

3. The system of claim 2, wherein the simulated output generator employs an amplified, inverted version of the low-side output waveform to determine a high-side portion of the simulated inductor waveform during on-times of the switching converter.

4. The system of claim 3, wherein the simulated output generator employs the minimum values and slopes of the amplified, inverted version of the low-side output waveform to determine a high-side portion of the simulated inductor waveform during on-times of the switching converter.

5. A power supply system comprising:
a switching converter that provides an output voltage by alternately turning on and off between opposing states a high-side transistor and a low-side transistor both coupled to an output inductor through a switching node, the switching converter including a drive circuit that regulates the output voltage based on a feedback signal; and
a simulated output generator that generates and provides the drive circuit with a simulated inductor waveform as the feedback signal based on a low-side output waveform of the low-side transistor measured at the switching node during off-times of the switching converter,
wherein the simulated output generator comprises:
a first control loop that regulates slopes of the simulated inductor waveform with the amplified, inverted version of the low-side output waveform;
a second control loop that regulates minimum values of the simulated inductor waveform with the amplified, inverted version of the low-side output waveform;
further comprising:
a temperature compensated gain and inverter circuit that receives the low-side output waveform and generates the amplified inverted version of the low-side output waveform; and
a buffer circuit that provides a low impedance transition of the amplified inverted version of the low-side output waveform, the buffer circuit comprising a first level shifter configured to shift up the amplified inverted version of the low-side output waveform such that the signal has a negative voltage rail greater than zero volts to provide for the capture of negative current and a second level shifter that provides the amplified, inverted version of the low-side output waveform and the simulated inductor waveform to the first control loop.

6. The system of claim 5, further comprising a sample and hold device that samples and provides, to the second control loop, minimum values of the amplified, inverted version of the low-side output waveform and the minimum values of the simulated inductor waveform.

7. A simulated output generator for providing a simulated inductor waveform to be employed as a feedback signal to a switching converter that includes a high-side transistor and a low-side transistor both coupled to an output inductor through a switching node, the high-side and low side-transistors alternating between opposing on and off states with the high-side transistor being on during on-times and the low-side transistor being on during off-times, the simulated output generator comprising:
a gain and inverter circuit that receives a low-side output waveform of the low-side transistor measured during off-times and generates an amplified inverted version of the low-side output waveform;
a first control loop that regulates the falling edge slope of the simulated inductor waveform with the amplified, inverted version of the low-side output waveform;
a second control loop that regulates minimum values of the simulated inductor waveform with the amplified, inverted version of the low-side output waveform of the low-side transistor; and
a charging capacitor coupled to outputs of the first and second control loops, the charging capacitor charges to produce on-times of the simulated inductor waveform and discharges to produce off-times of the simulated inductor waveform, wherein the first control loop controls the modulation of the charging of the charging capacitor and the second control loop controls the modulation of the discharging of the charging capacitor, wherein the first control loop comprises a first transconductance amplifier with an output coupled to a first compensation network capacitor and with inputs that receive the simulated inductor waveform and the amplified, inverted version of the low-side output waveform and the second control loop comprises a second transconductance amplifier with an output coupled to a second compensation network capacitor and with inputs that receive sampled minimum values of the simulated inductor waveform and sampled minimum values of the amplified, inverted version of the low-side output waveform.

8. The generator of claim 7, wherein the simulated inductor waveform is a simulated inductor current waveform that is proportional to the actual inductor output current waveform through the output inductor.

9. A simulated output generator for providing a simulated inductor waveform to be employed as a feedback signal to a switching converter that includes a high-side transistor and a low-side transistor both coupled to an output inductor through a switching node, the high-side and low side-transistors alternating between opposing on and off states with the high-side transistor being on during on-times and the low-side transistor being on during off-times, the simulated output generator comprising:
a gain and inverter circuit that receives a low-side output waveform of the low-side transistor measured during off-times and generates an amplified inverted version of the low-side output waveform;
a first control loop that regulates the falling edge slope of the simulated inductor waveform with the amplified, inverted version of the low-side output waveform;
a second control loop that regulates minimum values of the simulated inductor waveform with the amplified, inverted version of the low-side output waveform of the low-side transistor; and
a charging capacitor coupled to outputs of the first and second control loops, the charging capacitor charges to produce on-times of the simulated inductor waveform and discharges to produce off-times of the simulated inductor waveform, wherein the first control loop controls the modulation of the charging of the charging capacitor and the second control loop controls the modulation of the discharging of the charging capacitor, further comprising a buffer circuit that provides a low impedance transition of the amplified, inverted version of the low-side output waveform, the buffer circuit comprising a first level shifter configured to shift up the amplified inverted version of the low-side output waveform such that the signal has a negative voltage rail greater than zero volts to provide for the capture of negative current and a second level shifter that provides the amplified, inverted version of the low-side output waveform and the simulated inductor waveform to the first control loop.

10. The generator of claim 9, wherein the simulated output generator employs the minimum values and slopes of the amplified, inverted version of the low-side output waveform to determine a high-side portion of the simulated inductor waveform during on-times of the switching converter.

11. The generator of claim 9, further comprising a sample and hold device that samples and provides, to the second control loop, minimum values of the amplified inverted version of the low-side output waveform and the minimum values of the simulated inductor waveform.

12. A method of regulating a switching converter that includes a high-side transistor and a low-side transistor both coupled to an output inductor through a switching node, the method comprising:
   alternating turning on and off the high-side transistor and the low side-transistor between opposing states with the high-side transistor being on during on-times and the low-side transistor being on during off-times;
   inverting and amplifying a low-side output waveform of the low-side transistor measured during off-times;
   regulating with a first control loop the falling edge slope of the simulated inductor waveform with the amplified, inverted version of the low-side output waveform;
   regulating with a second control loop minimum values of the simulated inductor waveform with the amplified, inverted version of the low-side output waveform of the low-side transistor;
   determine a high-side portion of the simulated inductor waveform during on-times based on the low-side output waveform;
   generating a simulated inductor waveform that is proportional to an actual inductor output current through the output inductor based on the low-side output waveform and the determined high-side portion by modulating charging of charging capacitor to produce on-times of the simulated inductor waveform and modulating discharging of the charging capacitor to produce off-times of the simulated inductor waveform.

13. The method of claim 12, wherein the simulated inductor waveform is a simulated inductor current waveform.

14. The method of claim 12, further comprising regulating slopes of the simulated inductor waveform with the amplified, inverted version of the low-side output waveform.

15. The method of claim 14, further comprising regulating minimum values of the simulated inductor waveform with the amplified, inverted version of the low-side output waveform.

\* \* \* \* \*